US009411142B2

United States Patent
Ue et al.

(10) Patent No.: US 9,411,142 B2
(45) Date of Patent: Aug. 9, 2016

(54) MICROSCOPE SYSTEM, METHOD FOR CORRECTING A SPHERICAL ABERRATION, AND STORAGE MEDIUM

(71) Applicant: OLYMPUS CORPORATION, Shibuya-ku, Tokyo (JP)

(72) Inventors: Yoshihiro Ue, Hidaka (JP); Daisuke Nishiwaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 187 days.

(21) Appl. No.: 14/180,189

(22) Filed: Feb. 13, 2014

(65) Prior Publication Data

US 2014/0233094 A1    Aug. 21, 2014

(30) Foreign Application Priority Data

Feb. 20, 2013  (JP) .................................. 2013-031483

(51) Int. Cl.
    *G02B 21/00* (2006.01)
(52) U.S. Cl.
    CPC .......... *G02B 21/008* (2013.01); *G02B 21/0072* (2013.01)
(58) Field of Classification Search
    CPC ........... H01J 37/153; H01J 2237/1534; G02B 27/0068; G02B 21/365; G02B 21/02; G02B 13/18
    USPC .......... 359/368, 369, 379–385, 656; 250/311, 250/396 R, 307; 348/79, E07.085
    See application file for complete search history.

(56) References Cited

U.S. PATENT DOCUMENTS

2005/0024718 A1* 2/2005 Sase .................... G02B 27/0025
                                                    359/368
2011/0102572 A1* 5/2011 Kihara ................. G02B 21/244
                                                    348/79

FOREIGN PATENT DOCUMENTS

JP          2005-031507 A    2/2005
JP          2005-43624 A     2/2005

* cited by examiner

*Primary Examiner* — Scott J Sugarman
*Assistant Examiner* — Mustak Choudhury
(74) *Attorney, Agent, or Firm* — Holtz, Holtz & Volek PC

(57) ABSTRACT

A microscope system includes: an objective; a correction apparatus which corrects a spherical aberration; a controller which obtains a plurality of combinations of a relative position of the objective to a sample and an optimum value, which is a set value of the correction apparatus in a state in which a spherical aberration caused in accordance with the relative position has been corrected, calculates a function expressing the relationship between the relative position and the optimum value on the basis of the obtained plurality of combinations by interpolation, and calculates the optimum value according to an observation target surface of the sample, on the basis of the function and the relative position which is determined from the observation target surface; and a correction apparatus driving apparatus which drives the correction apparatus in accordance with the optimum value, which is calculated by the controller.

10 Claims, 17 Drawing Sheets

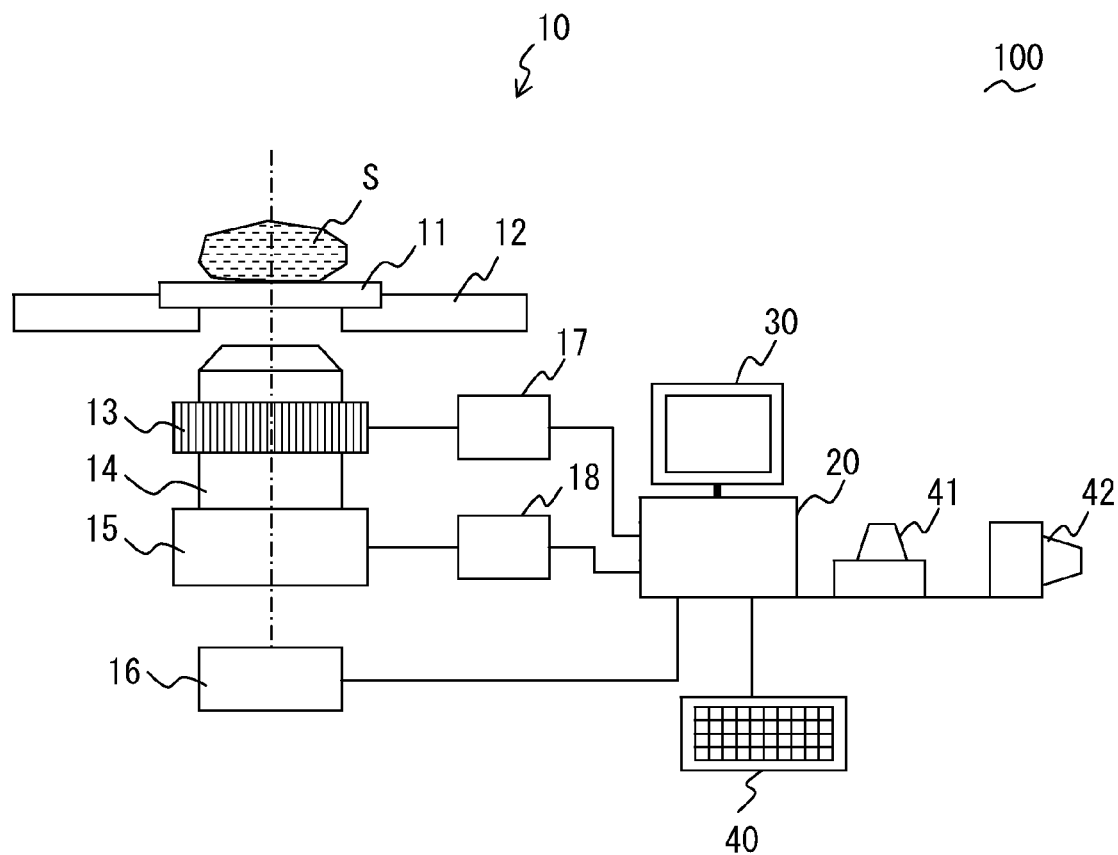
F I G. 1

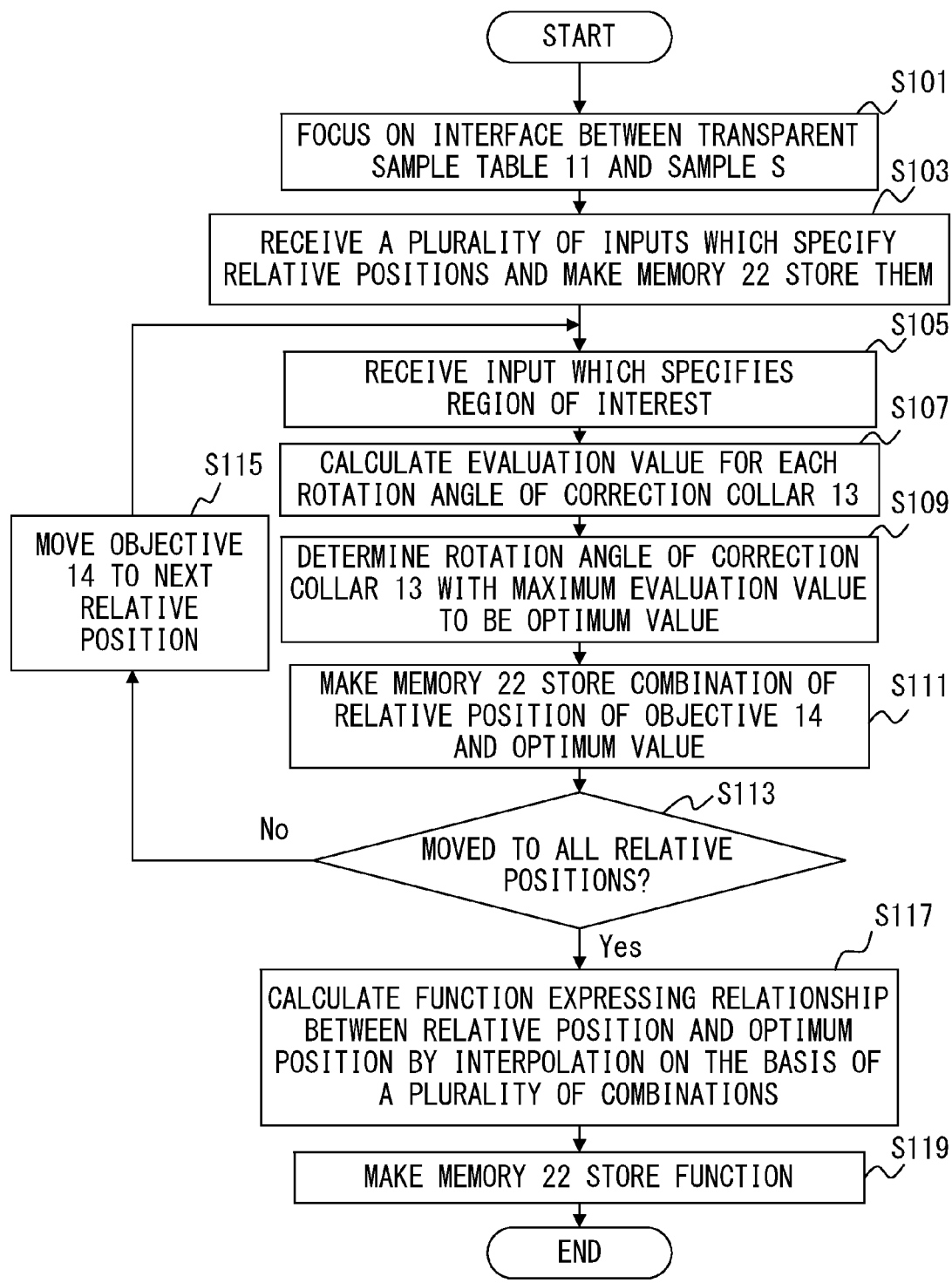
F I G. 3

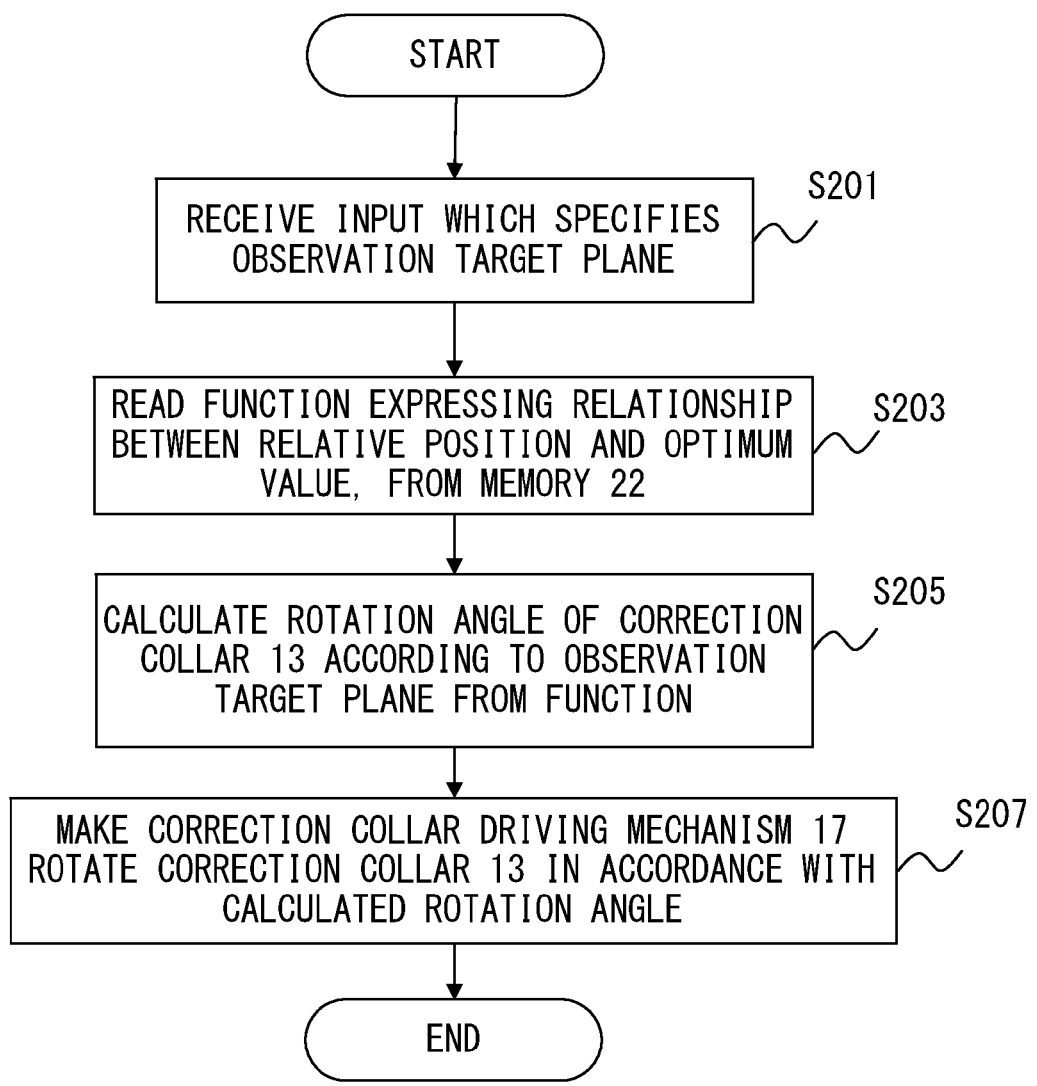
F I G. 4

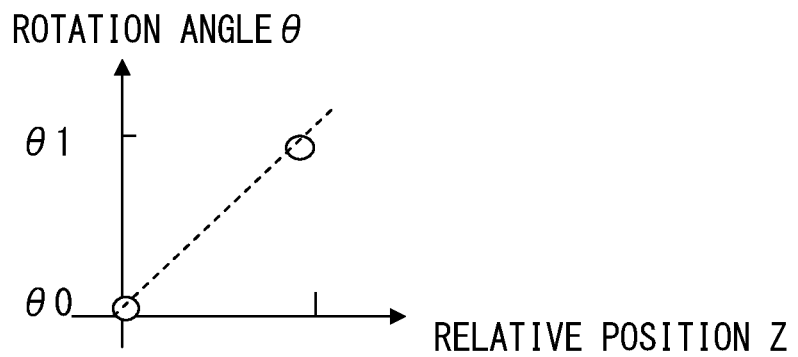
F I G. 7 B

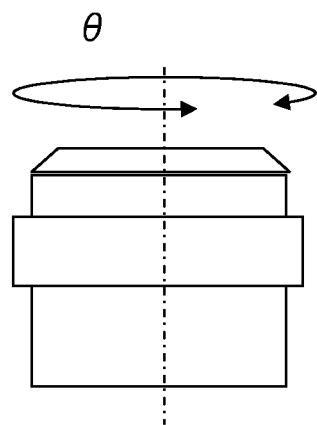
F I G. 9 A

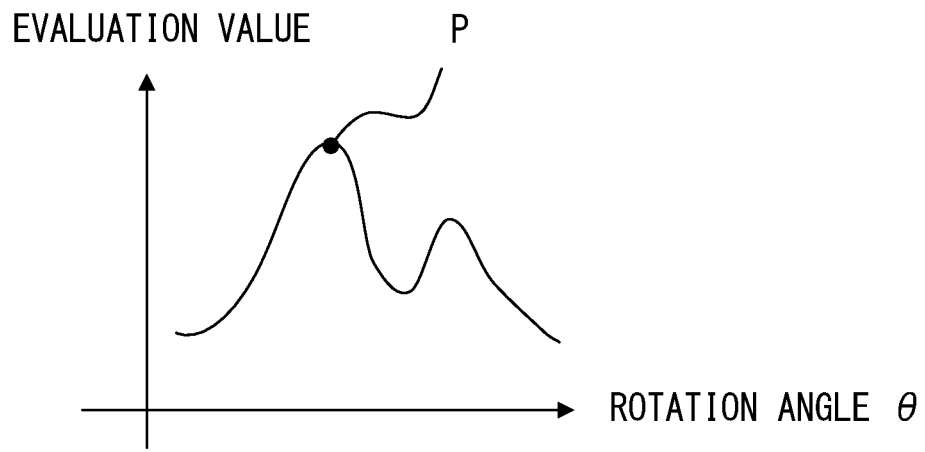
F I G. 9 B

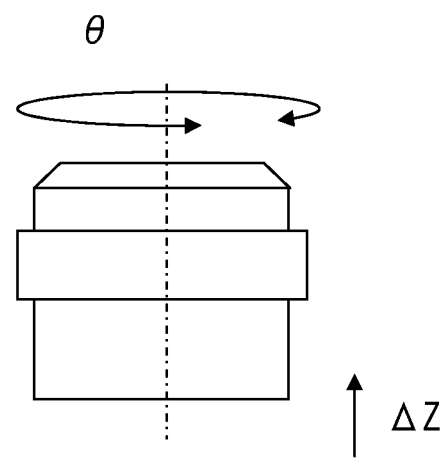
F I G. 1 1 A

MICROSCOPE SYSTEM, METHOD FOR CORRECTING A SPHERICAL ABERRATION, AND STORAGE MEDIUM

CROSS REFERENCE TO RELATED APPLICATIONS

This application is based upon and claims the benefit of priority from prior Japanese Patent Application No. 2013-031483, filed Feb. 20, 2013, the entire contents of which are incorporated herein by this reference.

BACKGROUND OF THE INVENTION

1. Field of the Invention

The present invention relates to a microscope system and a storage medium which stores a program of the microscope system.

2. Description of the Related Art

In observing a sample under a microscope, it has been known that a different amount of spherical aberration occurs depending on the thickness of a cover glass, and a correction collar of an objective has been known as means for correcting the spherical aberration caused by the thickness of the cover glass.

In the past, the correction collar has been mainly used as the means for correcting the spherical aberration caused by the thickness of the cover glass. In recent years, a technique in which a deep portion of a sample is observed has been developed and has been popular, and the correction collar is also used for the purpose of correcting a spherical aberration which changes in accordance with the depth of an observation target surface.

However, as it is not easy to judge whether a spherical aberration has been optimally corrected while observing a sample image, a task of correcting the spherical aberration using a correction collar tends to be avoided, and the correction collar is not often utilized sufficiently. Therefore, a technology for assisting in the task of correcting the spherical aberration using the correction collar has been proposed, and the technology is disclosed in Japanese Laid-Open Patent Application Publication No. 2005-043624, for example.

Japanese Laid-Open Patent Application Publication No. 2005-043624 discloses a microscope system in which an optimum rotation position of a correction collar with a minimum aberration is calculated in accordance with observation conditions, including a temperature of a sample, a refractive index of the sample, and the depth of an observation target surface. In the microscope system disclosed in Japanese Laid-Open Patent Application Publication No. 2005-043624, when the observation conditions are input, the correction collar automatically rotates to the optimum rotation position according to the observation conditions.

SUMMARY OF THE INVENTION

An aspect of the present invention provides a microscope system which includes: an objective; a correction apparatus which corrects a spherical aberration; a controller which obtains a plurality of combinations of a relative position of the objective to a sample and an optimum value which is a set value of the correction apparatus in a state in which a spherical aberration caused according to the relative position has been corrected, calculates a function expressing the relationship between the relative position and the optimum value on the basis of the obtained plurality of combinations by interpolation, and calculates the optimum value according to an observation target surface on the basis of the function and the relative position which is determined from the observation target surface of the sample, which is orthogonal to an optical axis of the objective; and a correction apparatus driving apparatus which drives the correction apparatus according to the optimum value, which is calculated by the controller.

Another aspect of the present invention provides a nontransitory storage medium which stores a program of a microscope system, the microscope system comprising an objective, a correction apparatus configured to corrects a spherical aberration, and a correction apparatus driving apparatus configured to drive the correction apparatus, wherein the program causes a computer to execute processes of: obtaining a plurality of combinations of a relative position of the objective to a sample and an optimum value, which is a set value of the correction apparatus in a state in which a spherical aberration caused in accordance with the relative position has been corrected; calculating a function which indicates a relationship between the relative position and the optimum value from the obtained plurality of combinations by interpolation; calculating the optimum value according to an observation target surface of the sample, which is orthogonal to an optical axis of the objective, on the basis of the calculated function and the relative position which is determined from the observation target surface; and making the correction apparatus driving apparatus drive the correction apparatus in accordance with the calculated optimum value.

BRIEF DESCRIPTION OF THE DRAWINGS

The present invention will be more apparent from the following detailed description when the accompanying drawings are referenced.

FIG. 1 illustrates a configuration of a microscope system according to Embodiment 1 of the present invention.

FIG. 3 is a flowchart of a function calculation process which is performed before the observation by the microscope system according to Embodiment 1 of the present invention.

FIG. 4 is a flowchart of a spherical aberration correction process which is performed in the observation by the microscope system according to Embodiment 1 of the present invention.

FIG. 7B is a drawing for explaining a method for obtaining a function which expresses the relationship between a relative position and a rotation angle of a correction collar, and is a graph which plots an optimum value of a correction collar for each relative position.

FIG. 9A is another drawing for explaining the method for obtaining the relationship between an evaluation value and a rotation angle of a correction collar, and illustrates the rotation of the correction collar.

FIG. 9B is another drawing for explaining the method for obtaining the relationship between an evaluation value and a rotation angle of a correction collar, and is a graph which illustrates an evaluation value for each rotation angle.

FIG. 11A illustrates three-dimensional information which indicates the relationship between an evaluation value, a relative position of an objective, and a rotation angle of a correction collar.

DESCRIPTION OF THE EMBODIMENTS

Embodiment 1

Figure 2:
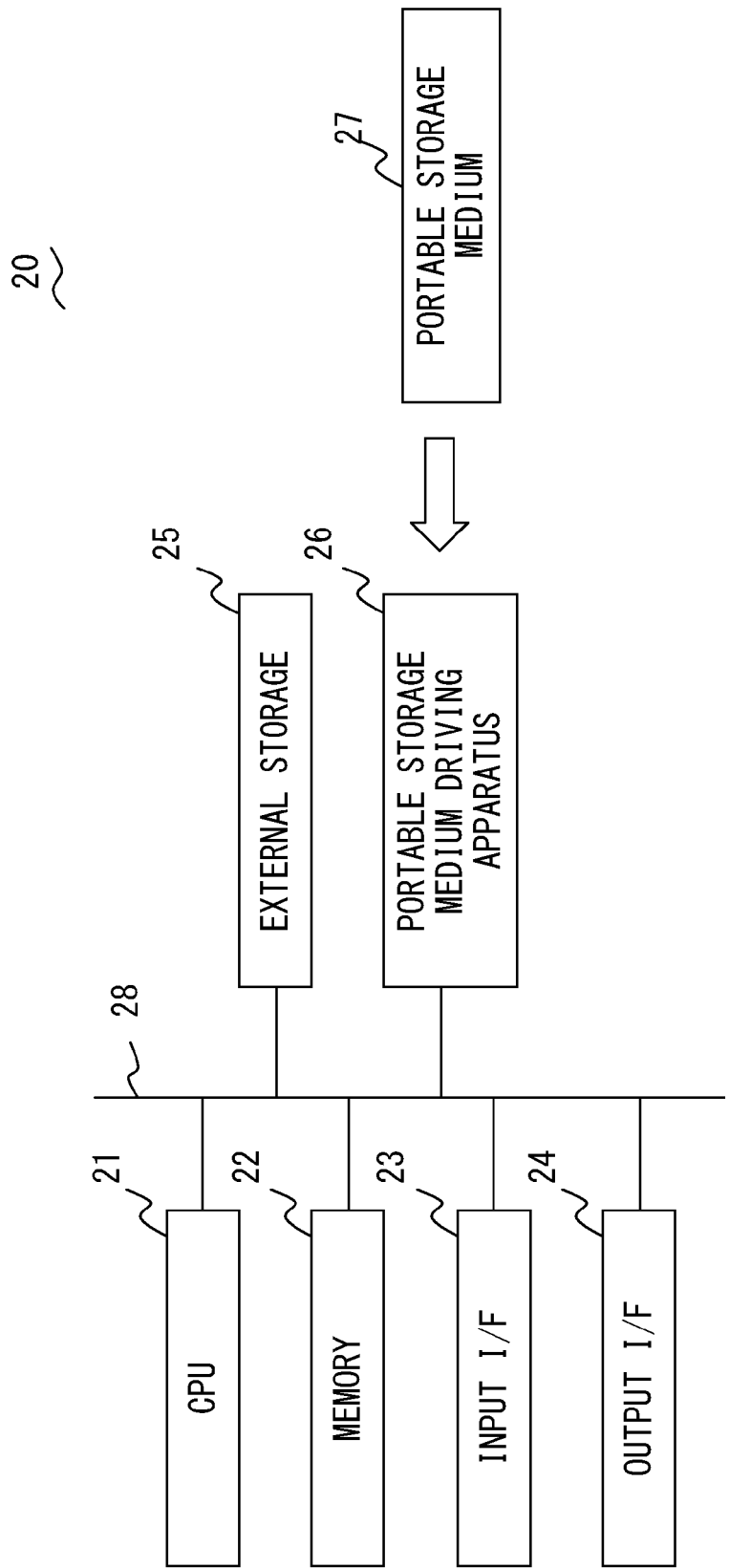
FIG. 2 illustrates a hardware configuration of a computer 20 which is included in the microscope system according to Embodiment 1 of the present invention.

FIG. 1 illustrates a configuration of a microscope system 100 according to this embodiment. FIG. 2 illustrates a hardware configuration of a computer 20 which is included in the microscope system 100. With reference to FIG. 1 and FIG. 2, the configuration of the microscope system 100 is described.

The microscope system 100 illustrated in FIG. 1 includes a microscope apparatus 10, a computer 20, a monitor 30, and a plurality of input apparatuses used for inputting instructions to the computer 20 (a keyboard 40, a correction collar operation apparatus 41 used for operating a correction collar 13, and a Z revolver operation apparatus 42 used for operating a Z revolver 15). The monitor 30 is a touch panel display apparatus, and it operates as a display apparatus and an input apparatus.

The microscope apparatus 10 includes a transparent sample table 11 on which a sample S is arranged, a stage 12 which supports the transparent sample table 11, a correction collar 13 which is a correction apparatus which corrects a spherical aberration, an objective 14 including the correction collar 13, a Z revolver 15 on which the objective 14 is mounted, an imaging apparatus 16 which images the sample S, a correction collar driving mechanism 17 which rotates the correction collar 13, and a Z revolver driving mechanism 18 which moves the Z revolver 15 in an optical axis direction of the objective 14. The imaging apparatus 16 and the correction collar driving mechanism 17, and the Z revolver driving mechanism 18 are connected to the computer 20, and are configured to operate under the control of the computer 20.

In the microscope apparatus 10, light from the sample S is condensed through the transparent sample table 11 and the objective 14 on the imaging apparatus 16 so that the sample S is imaged by the imaging apparatus 16 and image data of the sample S is obtained. The obtained image data is output to the computer 20.

The correction collar 13 is means for moving a lens in the objective 14 in an optical axis direction according to the rotation amount, and the amount of spherical aberration which is caused in the objective 14 is changed with the change in distance between lenses configuring the objective 14. In the microscope apparatus 10, the correction collar driving mechanism 17 rotates the correction collar 13 so that a spherical aberration in which the generation amount changes according to a thickness of the transparent sample table 11 or the depth of an observation target surface is satisfactorily corrected by the spherical aberration of the objective 14.

In FIG. 1, the correction collar 13 is exemplified as a correction apparatus which corrects a spherical aberration; however, the correction apparatus is not limited to the correction collar 13, but may be anything that can change the amount of spherical aberration which occurs on an optical path. The correction apparatus may be, for example, an apparatus which moves an optical lens not illustrated which is arranged between the objective 14 and the imaging apparatus 16, or an apparatus using an LCOS (Liquid crystal on silicon (trademark)), a DFM (Deformable Mirror), a liquid lens, or the like.

Further, FIG. 1 exemplifies a configuration in which the Z revolver 15 is moved in an optical axis direction so that a respective position of the objective 14 to the sample S is changed and the observation target surface of the sample S is changed; however, a configuration in which the observation target surface is changed is not limited to this. The configuration may be anything that can change the relative position of the objective 14 to the sample S, and the relative position of the objective 14 to the sample S may be changed by, for example, moving the stage 12 in an optical axis direction. In this case, the microscope system 100 may include a stage driving mechanism which moves the stage 12 in the optical axis direction, instead of the Z revolver driving mechanism 18.

The computer 20 is a controller which controls an operation of the entirety of the microscope system 100. The computer 20 may be a general-purpose computer such as a work station or a personal computer, or a dedicated apparatus.

As illustrated in FIG. 2, the computer 20 includes a CPU (Central Processing Unit) 21, a memory 22, an input I/F 23, an output I/F 24, an external storage 25, and a portable storage medium driving apparatus 26 into which a portable storage medium 27 is inserted, and these are respectively connected to a bus 28. FIG. 2 is an example of a configuration of the computer 20, and the computer 20 is not limited to this configuration.

The CPU 21 executes a program and controls the entirety of the computer 20. The memory 22 is, for example, a RAM (Random Access Memory), and it is a memory which temporarily stores a program or data stored in the external storage 25 or the portable storage medium 27, at the time of executing the program.

The input I/F 23 is means which detects signals from the keyboard 40, the correction collar operation apparatus 41, the Z revolver operation apparatus 42, and the monitor 30 that are input apparatuses, and it operates as an input reception unit which receives an input by an observer. The output I/F 24 is means which outputs signals to the monitor 30 that is a display apparatus, and it operates as a display controller which controls a display of the monitor 30. The output I/F 24 may output signals to a printer not illustrated.

The external storage 25 is, for example, a hard disk storage, and it is mainly used for storing various types of data or programs. The portable storage medium driving apparatus 26 accommodates the portable storage medium 27, e.g., an optical disk or a CompactFlash (registered trademark), and it plays a role in assisting the external storage 25.

FIG. 3 is a flowchart of a function calculation process which is performed before the observation by the microscope system according to this embodiment. FIG. 4 is a flowchart of a spherical aberration correction process which is performed in the observation by the microscope system according to this embodiment. With reference to FIG. 3 and FIG. 4, the operation of the microscope system 100 is described below in detail.

In the microscope system 100, after the sample S is arranged on the transparent sample table 11, a function calculation process illustrated in FIG. 3 is performed by the computer 20 before the observation of the sample S is started. The process illustrated in FIG. 3 is performed by loading a program stored in the external storage 25 or the portable storage medium 27 on the memory 22 and executing it in the CPU 21, and the process is started by an instruction from an observer to start the function calculation process using, for example, the keyboard 40.

First, the computer 20 controls the Z revolver driving mechanism 18 and focuses on an interface between the transparent sample table 11 and the sample S (step S101). This step can be performed with a known optional method. A relative position of the objective 14 to the sample S at this time is referred to as a position Z0.

Then, the computer 20 receives a plurality of inputs by the observer that specify relative positions, and stores the received relative positions in the memory 22 (step S103). The inputs by the observer of the relative positions are performed using an input apparatus such as the keyboard 40.

Figure 5:
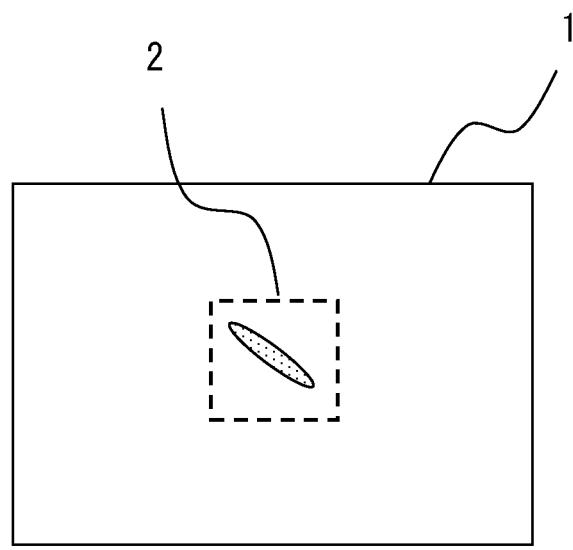
FIG. 5 is a drawing for explaining a method for specifying a region of interest.

Next, the computer 20 displays an image of the sample S in the current relative position (in this case, the position Z0) on the monitor 30, and receives an input by the observer that specifies a range to be evaluated in the sample S (hereinafter referred as a "region of interest") (step S105). The input by the observer of the region of interest is performed using an input apparatus such as the keyboard 40 so as to include a portion to be observed more satisfactorily, e.g., a portion having a characteristic shape in the sample S, while observing an image 1 of the sample S, which is displayed on the monitor 30, as illustrated in FIG. 5, for example. The computer 20 detects a specified portion of the image 1 of the sample S as a region of interest 2, and stores it in the memory 22.

Figure 6A:
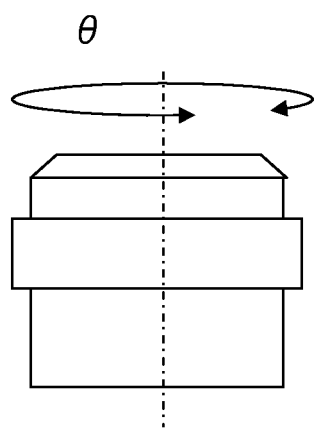
FIG. 6A is a drawing for explaining a method for obtaining the relationship between an evaluation value and a rotation angle of a correction collar, and illustrates the rotation of the correction collar.
Figure 6B:
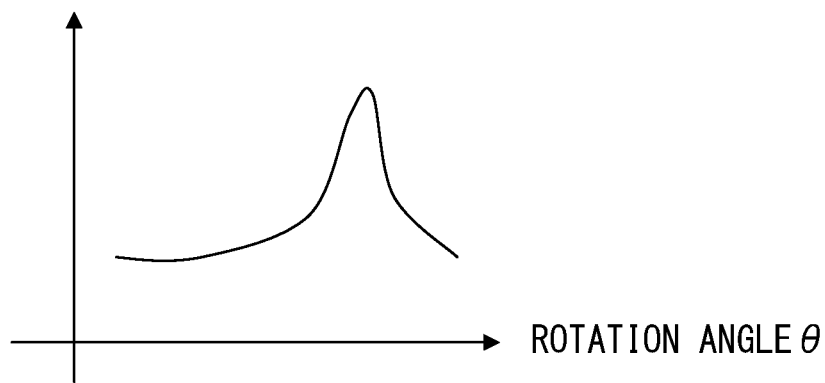
FIG. 6B is a drawing for explaining a method for obtaining the relationship between an evaluation value and a rotation angle of a correction collar, and is a graph which illustrates a evaluation value for each rotation angle.

Further, the computer 20 calculates an evaluation value for each rotation angle of the correction collar 13 (step S107). Specifically, the computer 20 controls the correction collar driving mechanism 17 first, and makes the correction collar driving mechanism 17 rotate the correction collar 13, as illustrated in FIG. 6A. Then, the computer 20 makes the imaging apparatus 16 obtain image data of the sample S for each rotation angle of the correction collar 13. Namely, the computer 20 makes the imaging apparatus 16 obtain plural pieces of image data while changing the rotation angle that is a set value of the correction apparatus. Furthermore, the computer 20 calculates an evaluation value indicating a contrast of each image from each of the obtained plural pieces of image data with a contrast evaluation method. When this happens, the evaluation value is calculated within the range of the region of interest 2 received from the observer in step S105. As a result, the relationship between the evaluation value and the rotation angle of the correction collar 13 as illustrated in FIG. 6B is obtained.

When the evaluation value for each of the rotation angles is calculated, the computer 20 determines a rotation angle of the correction collar 13 with a maximum evaluation value to be an optimum value (in this case, a rotation angle $\theta 0$) (step S109). The reason for this is that the contrast of an image is high in a state in which a spherical aberration has been satisfactorily corrected and therefore a state in which an evaluation value is at the maximum is considered to be a state in which the spherical aberration has been satisfactorily corrected. Note that the optimum value is a set value of a correction apparatus (in this case, the rotation angle of the correction collar 13) in a state in which a spherical aberration caused according to a relative position has been corrected.

When the optimum value is calculated, the computer 20 makes the memory 22 store a combination of the current relative position (in, this case, the position Z0) and the optimum value determined in step S109 (in this case, the rotation angle $\theta 0$) (step S111).

Then, the computer 20 judges whether the objective 14 has moved to all of the relative positions received in step S103 (step S113). When the computer 20 judges that there are relative positions to which the objective 14 has not yet moved, the computer 20 controls the Z revolver driving mechanism 18 so as to move the objective 14 to the next relative position (for example, a position Z1) (step S115). Then, the processes of step S105 to step S111 are repeated.

As described above, by repeating the processes of step S105 to step S111 in all of the relative positions, the computer 20 determines a rotation angle with the calculated evaluation value maximum to be an optimum value, for each of the relative positions, and obtains a plurality of combinations of a relative position and an optimum value.

Figure 7A:
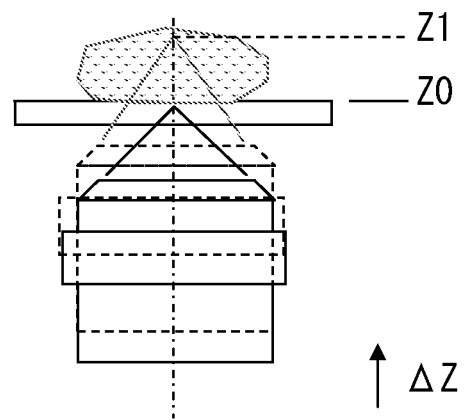
FIG. 7A is a drawing for explaining a method for obtaining a function which expresses the relationship between a relative position and a rotation angle of a correction collar, and illustrates a relative position of an objective.

When the computer 20 judges that the objective 14 has already moved to all of the relative positions, the computer 20 reads the plurality of combinations of a relative position and an optimum value, which are stored in step S111, from the memory 22, and calculates a function expressing the relationship between the relative position and the optimum value on the basis of the plurality of combinations by interpolation (step S117). The function may be calculated by linear interpolation on the basis of the combination of the relative position Z0 and the optimum value $\theta 0$ and the combination of the relative position Z1 and the optimum value $\theta 1$, as illustrated in FIG. 7A and FIG. 7B. An interpolation method is not limited to a linear interpolation method, and an optional interpolation method may be used.

Lastly, the computer 20 makes the memory 22 store the function calculated in step S117 (step S119), and finishes the process.

In the microscope system 100, when the function calculation process illustrated in FIG. 3 is finished and the sample S is observed, the computer 20 performs a spherical aberration correction process illustrated in FIG. 4. The spherical aberration correction process illustrated in FIG. 4 is performed by loading a program stored in the external storage 25 or the portable storage medium 27 on the memory 22 and executing it in the CPU 21, and it is started by an instruction from an observer to start the spherical aberration correction process using, for example, the keyboard 40.

First, the computer 20 receives an input by an observer which specifies an observation target surface (step S201). The input by the observer of the observation target surface is performed using an input apparatus such as the keyboard 40.

Next, the computer 20 reads the function expressing the relationship between a relative position and an optimum value, which is calculated in the function calculation process illustrated in FIG. 3, from the memory 22 (step S203).

Then, the computer 20 calculates an optimum value according to the observation target surface (i.e., a rotation angle of the correction collar 13) on the basis of the function read in step S203 and the relative position which is determined from the observation target surface received in step S201 (step S205). Specifically, the optimum value according to the observation target surface is calculated by substituting the relative position received in step S201 for the function read in step S203.

Lastly, the computer 20 makes the correction collar driving mechanism 17 rotate the correction collar 13 according to the optimum value calculated in step S205 (step S207), and finishes the process. As a result, the correction collar driving mechanism 17 rotates the correction collar 13 according to the optimum value calculated by the computer 20, and sets the rotation angle of the correction collar 13 to be the optimum value.

The microscope system 100 according to this embodiment calculates a function expressing the relationship between a relative position and an optimum value by interpolation using the sample S that is an observation target, and corrects a spherical aberration using the function. Accordingly, in the microscope system 100, even when the depth of an observation target surface is changed, a spherical aberration which changes according to the depth of the observation target surface can be appropriately corrected.

Further, when the observer merely performs a plurality of inputs which specify a plurality of relative position, a region of interest, and an observation target surface, the microscope system 100 can appropriately correct the spherical aberration which changes according to the depth of the observation target surface. Therefore, in the microscope system 100, the spherical aberration according to the observation target surface can be easily corrected without the observer's input of information of the sample S, such as a temperature or a refractive index of the sample S. In addition, the spherical aberration can be appropriately corrected even when the observer does not grasp the information of the sample S.

Further, the microscope system 100 calculates a function using the sample S that is an observation target, before the observation is started, and corrects a spherical aberration using this function. Therefore, in the microscope system 100, a large amount of data does not need to be prepared in advance for each type of the sample S or each state of the sample S, and the observation of an unknown sample S can also be handled.

Further, in the microscope system 100, the function calculated before the start of the observation is calculated by interpolating a plurality of combinations of a relative position and an optimum value, and an optimum value according to the observation target surface is calculated by substituting a relative position determined from the observation target surface for the function. Therefore, in the microscope system 100, complicated arithmetic operations do not need to be performed in order to correct the spherical aberration, and the spherical aberration according to the observation target surface can be corrected in a short time.

In the microscope system 100, once a function is calculated before the observation is started, the spherical aberration can be corrected every time using the function when the observation target surface changes. In the microscope system 100, a function does not need to be calculated every time the observation target surface changes, and therefore, the spherical aberration according to the observation target surface can be corrected in a short time. Accordingly, the microscope system 100 is especially suitable, for example, in a case in which a Z-stack, in which a large number of images are captured while changing the depth of the observation target surface, is performed. Further, an optimum value can be calculated by only substituting a relative position for a function, and therefore, a sample does not need to be irradiated with light only for the purpose of calculating the optimum value. For that reason, the microscope system 100 is especially suitable for fluorescence observation, in which a sample fades in color due to light irradiation.

In the microscope system 100, the input of a relative position received in step S103 may be limited to only an input of a relative position where a focal position of the objective 14 is located closer to the sample S than the interface between the transparent sample table 11 and the sample S. By limiting the input of the relative position as described above, the focal position of the objective 14 corresponding to the relative position is limited within the sample S, and therefore, in step S117, a function which corrects a spherical aberration more appropriately can be calculated.

In the microscope system 100, a moving distance of the objective 14 from the position Z0, which is a relative position to which the objective 14 moves in step S101, may be limited to be within the working distance (WD) of the objective 14. As a result, the objective 14 can avoid touching the transparent sample table 11.

In the microscope system 100, in step S115, the objective 14 may be configured to move to relative positions in order of nearness to the relative position (the position Z0) to which the objective 14 moves in step S101. By determining the order of relative positions to which the objective 14 moves as described above, a direction in which the Z revolver driving mechanism 18 moves the objective 14 is fixed, and therefore, the high-precision positioning is available with the influence of a backlash removed. By also limiting a direction in which the correction collar driving mechanism 17 rotates the correction collar 13 in step S107 to a fixed direction, the influence of a backlash can be removed similarly. In a case in which the moving direction or the rotation direction is limited to a fixed direction, a stepping motor is preferably used for the correction collar driving mechanism 17. When the correction collar driving mechanism 17 is a stepping motor, a displacement amount can be determined by counting the number of drive pulses of the stepping motor, and therefore, high-precision positioning is available without using a displacement sensor.

The processes illustrated in FIG. 3 and FIG. 4 are an example of the processes performed in the microscope system 100 according to this embodiment, and they can be modified in various ways. For example, in step S101 in FIG. 3, an example of focusing on the interface between the transparent sample table 11 and the sample S is given; however, the objective 14 may be moved to a relative position specified by the observer from the beginning.

Further, step S105 in FIG. 3, in which a region of interest is specified, may be omitted. However, in a case in which a plurality of peaks of an evaluation value occur in step S107 when the entirety of the sample S is evaluated, a region of interest is preferably specified in step S105. By appropriately specifying the region of interest 2, a situation in which a plurality of peaks of an evaluation value occur can be avoided, and therefore, the computer 20 can determine an optimum value at a higher speed.

In step S107 in FIG. 3, an evaluation value expressing the brightness of an image may be calculated instead of an evaluation value expressing a contrast of an image. In this case, a brightness evaluation method may be used instead of a contrast evaluation method. This is because the brightness of an image increases in a state in which a spherical aberration has been satisfactorily corrected.

A configuration of the microscope apparatus 10 is not limited to the configuration illustrated in FIG. 1. For example, in FIG. 1, the microscope apparatus 10 is illustrated as an inverted microscope; however, the microscope apparatus 10 is not limited to an inverted microscope, and it may be an upright microscope. In this case, in step S101, an interface between a cover glass and the sample S is focused on, instead of the interface between the transparent sample table 11 and the sample S.

Embodiment 2

Figure 8A:
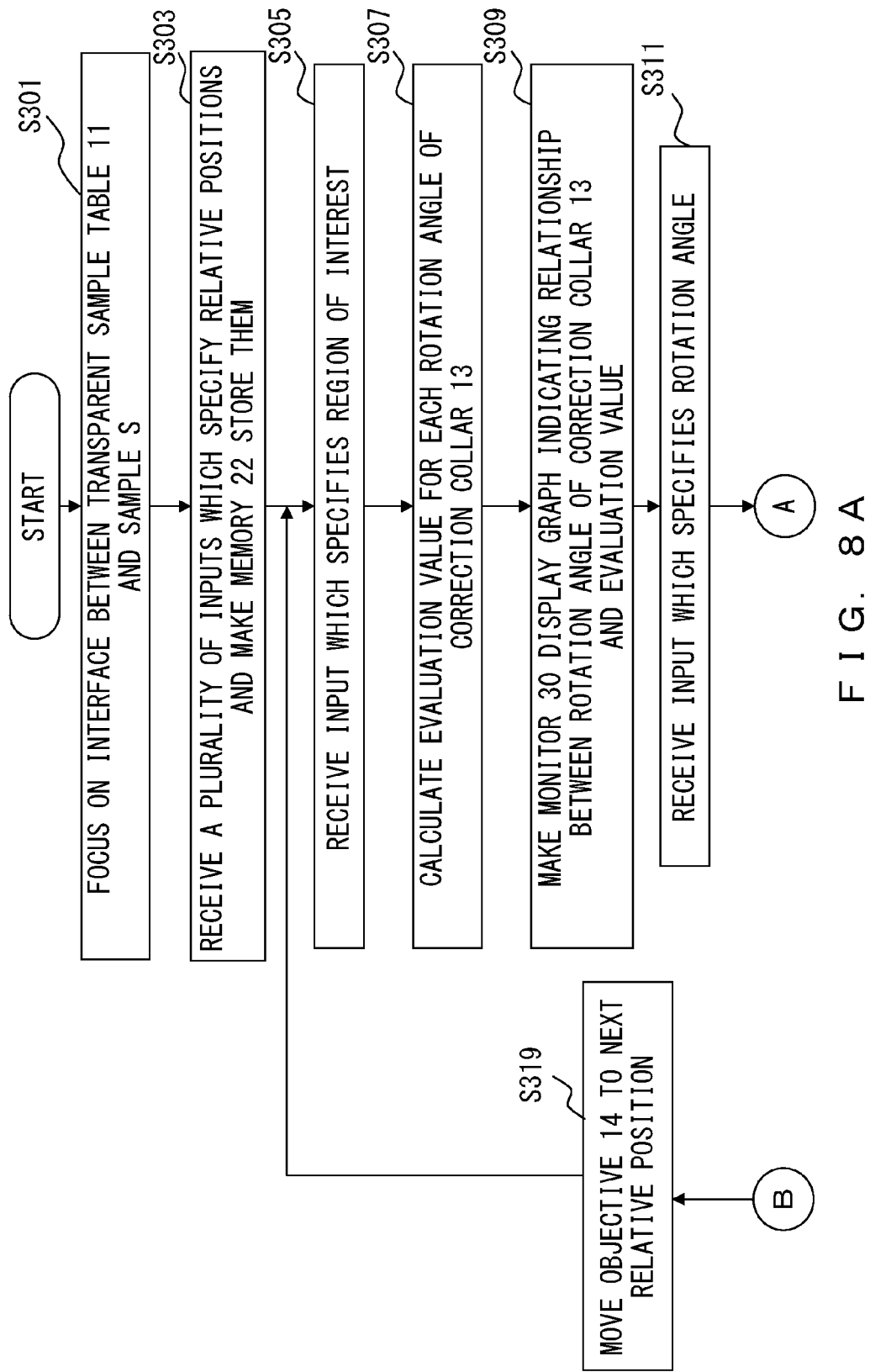
FIGS. 8A and 8B are flowchart of a function calculation process which is performed before the observation by a microscope system according to Embodiment 2 of the present invention.
Figure 8B:
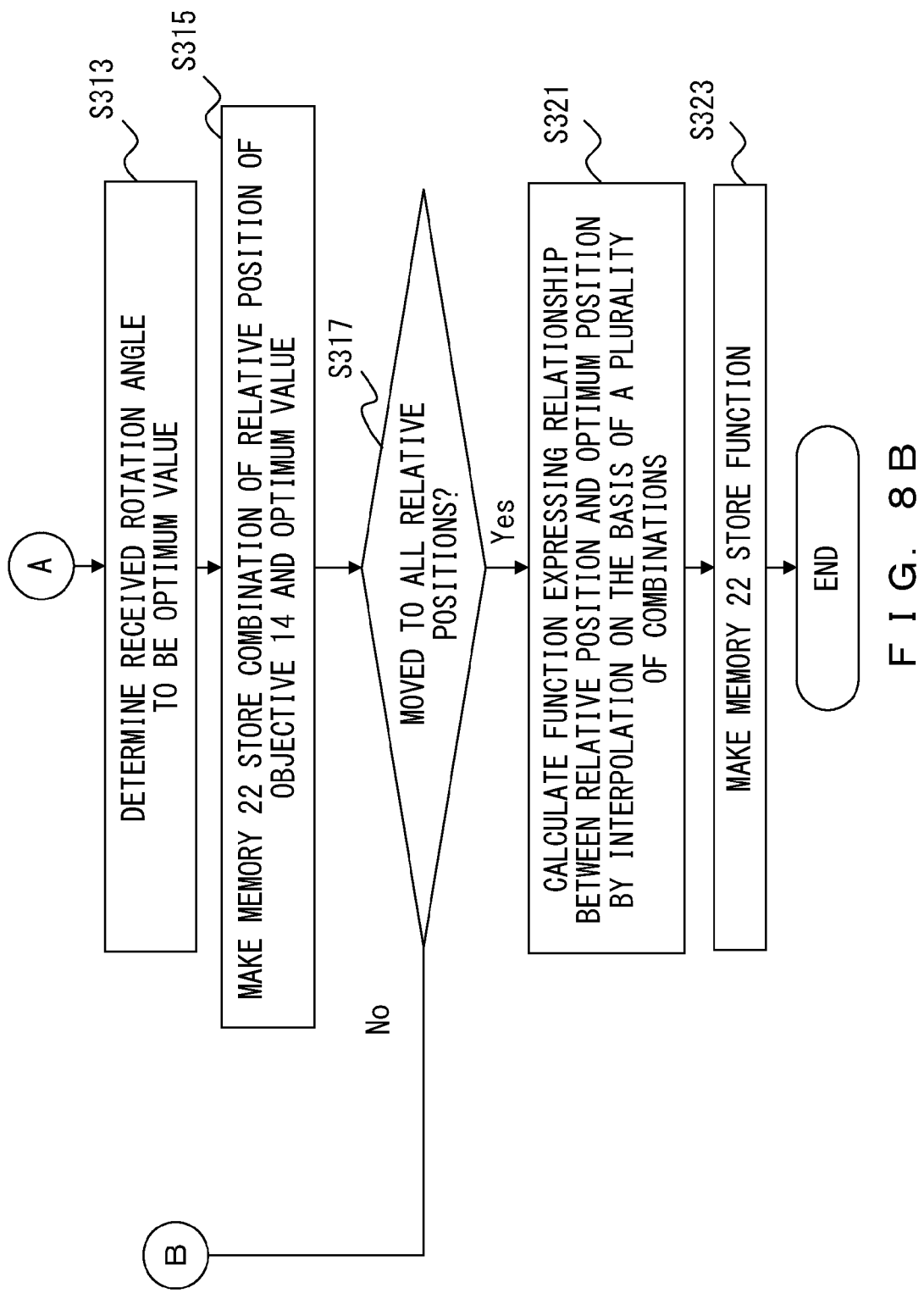

FIGS. 8A and 8B are flowchart of a function calculation process which is performed before the observation by a microscope system according to this embodiment. With reference to FIGS. 8A and 8B, the operation of the microscope system according to this embodiment is described below in detail. The microscope system according to this embodiment differs from the microscope system 100 according to Embodiment 1 in that the function calculation process illustrated in FIGS. 8A and 8B is performed instead of the function calculation process illustrated in FIG. 3. In the other respects, the microscope system according to this embodiment is the same as the microscope system 100 according to Embodiment 1, and therefore, the same components are denoted by the same references.

In the microscope system according to this embodiment, after the sample S is arranged on the transparent sample table 11 and before the observation of the sample S is started, the function calculation process illustrated in FIGS. 8A and 8B is performed by the computer 20. The process illustrated in FIGS. 8A and 8B is performed by loading a program stored in the external storage 25 or the portable storage medium 27 on the memory 22 and executing it in the CPU 21, and the process is started by the instruction from the observer to start the function calculation process using, for example, the keyboard 40.

The processes of step S301 to step S307 are the same as those of step S101 to step S107 in FIG. 3. In step S307, the computer 20 calculates an evaluation value for each rotation angle of the correction collar 13. Specifically, the computer 20 controls the correction collar driving mechanism 17 first, and makes the correction collar driving mechanism 17 rotate the correction collar 13 as illustrated in FIG. 9A. Then, the computer 20 makes the imaging apparatus 16 obtain image data of the sample S for each of the rotation angles of the correction collar 13. Further, the computer 20 calculates an evaluation value expressing a contrast of each image from each piece of the obtained image data with a contrast evaluation method. When this happens, the evaluation value is calculated within a range of the region of interest 2 received from the observer in step S305. As a result, the relationship between the evaluation value and the rotation angle of the correction collar 13 is obtained as illustrated in FIG. 9B.

When the evaluation value is calculated for each of the rotation angles, the computer 20 makes the monitor 30 display a graph illustrating the relationship between the rotation angle of the correction collar 13 and the evaluation value as illustrated in FIG. 9B (step S309).

Then, the computer 20 receives an input by the observer which specifies the rotation angle (step S311). The input by the observer of the rotation angle is performed manually using an input apparatus such as the correction collar operation apparatus 41 while referring to the graph displayed on the monitor 30. The computer 20 determines the received rotation angle to be an optimum value (step S313), and makes the memory 22 store a combination of the current relative position and the optimum value determined in step S313 (step S315). The observer may specify a rotation angle corresponding to a point P by touching the point P with a maximum evaluation value on the graph illustrated in FIG. 9B. In this case, the computer 20 detects the touch on the monitor displaying the graph, and determines the rotation angle corresponding to the point P on the graph, which is located in the position where the touch is detected, to be an optimum value.

Then, the computer 20 judges whether the objective 14 moves to all of the relative positions which were received in step S303 (step S317). When the computer 20 judges that there is a respective position to which the objective 14 has not yet moved, the computer 20 controls the Z revolver driving mechanism 18 to move the objective 14 to the next relative position (step S319). Then, the processes of step S305 to step S315 are repeated.

As described above, by repeating the processes of step S305 to step S315 in all of the relative positions, the computer 20 determines the rotation angle which is received after the graph is displayed to be an optimum value, for each of the relative positions, and obtains a plurality of combinations of a relative position and an optimum value.

When the computer 20 judges that the objective 14 has already moved to all of the relative positions, the computer 20 reads the plurality of combinations of the relative position and the optimum value stored in step S315 from the memory 22, and calculates a function expressing the relationship between the relative position and the optimum value on the basis of the plurality of combinations by interpolation (step S321). Then, the computer 20 makes the memory 22 store the calculated function and finishes the process (step S323).

Also in the microscope system according to this embodiment, a similar effect obtained in the microscope system 100 according to Embodiment 1 can be obtained. Further, similarly to the microscope system 100 according to Embodiment 1, the microscope system according to this embodiment can be modified in various ways.

In the microscope system 100 according to Embodiment 1, an optimum value for each of the relative positions is automatically determined, whereas, in the microscope system according to this embodiment, after a graph illustrating the relationship between a rotation angle and an evaluation value for each of the relative positions is displayed on the monitor 30, the observer determines an optimum value for each of the relative positions while referring to the graph. Therefore, an optimum value for each of the relative positions can be appropriately determined, even in a case in which a plurality of peaks of an evaluation value occur as illustrated in FIG. 9B, a case in which it is difficult to automatically specify the peak due to an influence of noise, or other cases.

Embodiment 3

Figure 10A:
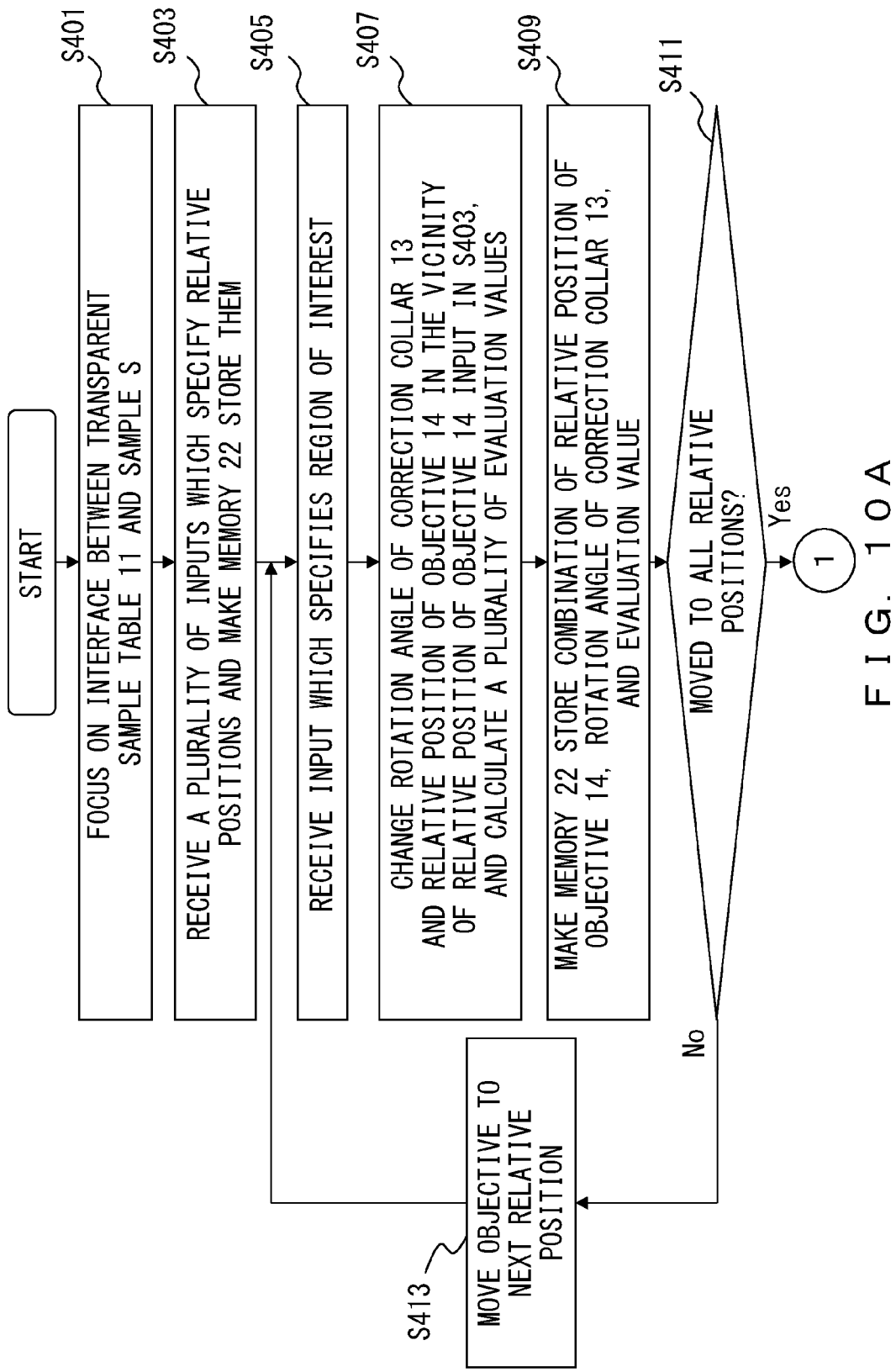
FIGS. 10A and 10B are flowchart of a function calculation process which is performed before the observation by a microscope system according to Embodiment 3 of the present invention.
Figure 10B:
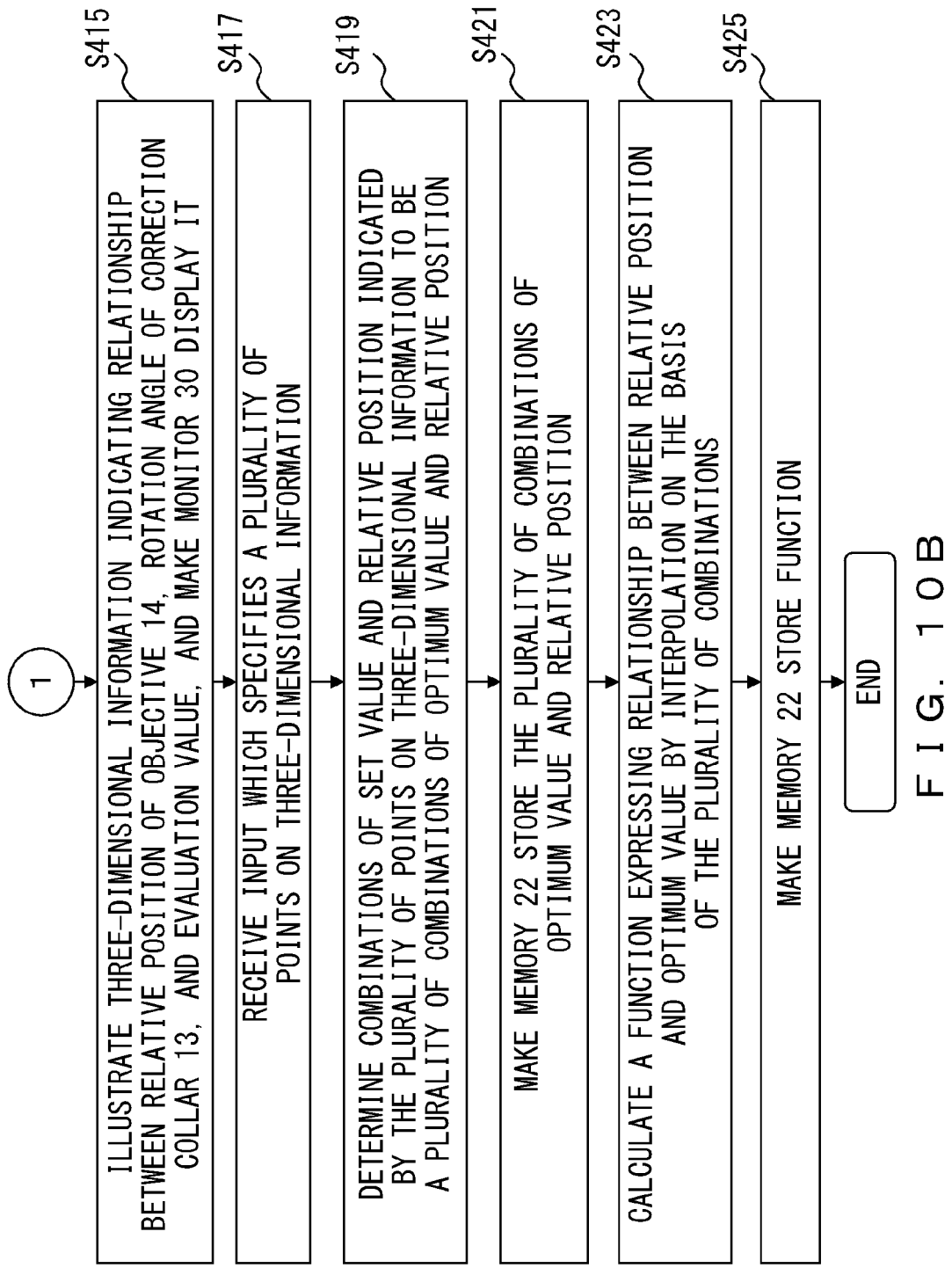

FIGS. 10A and 10B are flowchart of a function calculation process which is performed before the observation by a microscope system according to this embodiment. With reference to FIGS. 10A and 10B, the operation of the microscope system according to this embodiment is described below in detail. The microscope system according to this embodiment differs from the microscope system 100 according to Embodiment 1 in that a function calculation process illustrated in FIGS. 10A and 10B is performed instead of the function calculation process illustrated in FIG. 3. In the other respects, the microscope system according to this embodiment is similar to the microscope system 100 according to Embodiment 1, and therefore, the same components are denoted by the same references.

In the microscope system according to this embodiment, after the sample S is arranged on the transparent sample table 11 and before the observation of the sample S is started, the computer 20 performs the function calculation process illustrated in FIGS. 10A and 10B. The process illustrated in FIGS. 10A and 10B is performed by loading a program stored in the external storage 25 or the portable storage medium 27 on the memory 22 and executing it in the CPU 21, and the process is started by an instruction from the observer to start the function calculation process using, for example, the keyboard 40. The processes of step S401 to step S405 are similar to those of step S101 to step S105 in FIG. 3.

The computer 20 changes the rotation angle of the correction collar 13 and the relative position of the objective 14 in the vicinity of the relative position of the objective 14 input in step S403, i.e., within a Z range from the relative position of the objective 14 input in step S403 to a position which is assumed to be varied by the rotation of the correction collar 13, and it calculates a plurality of evaluation values (step S407). Then, the computer 20 makes the memory 22 store a plurality of combinations of a relative position, a rotation angle, and an evaluation value (step S409).

Specifically, the computer 20 first controls the correction collar driving mechanism 17 and the Z revolver driving mechanism 18, and makes the correction collar driving mechanism 17 rotate the correction collar 13 and makes the Z revolver driving mechanism 18 move the objective 14, as illustrated in FIG. 11A. Then, the computer 20 makes the imaging apparatus 16 obtain image data of the sample S for each of the rotation angles of the correction collar 13 and for each of the relative positions of the objective 14. Namely, the computer 20 makes the imaging apparatus 16 obtain plural pieces of image data while changing the rotation angle and the relative position. Further, the computer 20 calculates an evaluation value indicating a contrast of each image from each of the obtained pieces of image data with a contrast evaluation method, and makes the memory 22 store a combination of an evaluation value, a relative position, and a rotation angle.

Then, the computer 20 judges whether the objective 14 has already moved to all of the relative positions received in step S403 (step S411). When the computer judges that there is a relative position to which the objective 14 has not yet moved, the computer 20 controls the Z revolver driving mechanism 18 so as to move the objective 14 to the next relative position (step S413). Then, the processes of step S405 to step S409 are repeated.

Figure 11B:
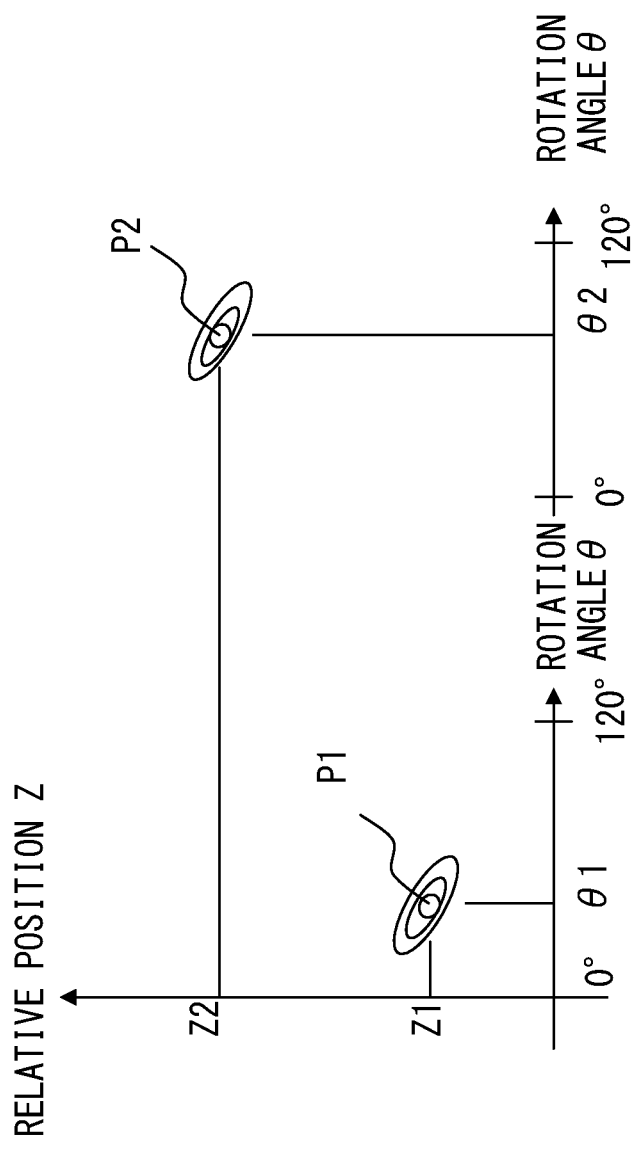
FIG. 11B illustrates three-dimensional information which indicates the relationship between an evaluation value, a relative position of an objective, and a rotation angle of a correction collar.

As described above, by repeating the processes of step S405 to step S409 in all of the relative positions, the computer 20 obtains, for each of the input relative positions, a plurality of combinations of a relative position, a rotation angle, and an evaluation value in the vicinity of each of the input relative positions. Then, the computer 20 makes the monitor 30 display three-dimensional information indicating the relationship between an evaluation value, a relative position, and a rotation angle, which is the plurality of combinations that the computer obtained and made the memory 22 store, as illustrated in FIG. 11B, for example (step S415). FIG. 11B illustrates contours expressing a distribution of evaluation values in a Zθ plane having axes of a relative position Z and a rotation angle θ, for each of the relative positions received in step S403, and illustrates the three-dimensional information indicating the relationship between the evaluation value, the relative position, and the rotation angle.

Then, the computer 20 receives an input by the observer which specifies a plurality of points on the illustrated three-dimensional information (step S417). The input by the observer of the plurality of points is performed using an input apparatus such as the monitor 30 or a keyboard 40, while referring to the three-dimensional information displayed on the monitor 30. The observer may specify the plurality of points by touching one point with a largest evaluation value (e.g., a point P1 or a point P2) for each of the contours on the illustrated three-dimensional information as illustrated in FIG. 11B, for example.

The computer 20 determines a plurality of combinations of a rotation angle and a relative position, which are expressed by the plurality of points received in step S417, to be a plurality of combinations of an optimum value and a relative position (step S419), and makes the memory 22 store them (step S421). In this embodiment, the computer 20 obtains the plurality of combinations of an optimum value and a relative position as described above.

Then, the computer 20 reads the plurality of combinations of a relative position and an optimum value stored in step S421, from the memory 22, and calculates a function expressing the relationship between a relative position and an optimum value on the basis of the plurality of combinations by interpolation (step S423). Lastly, the computer 20 makes the memory 22 store the calculated function and finishes the process (step S425).

In the microscope system according to this embodiment, a similar effect in the microscope systems according to Embodiment 1 and Embodiment 2 can be obtained. Further, similarly to Embodiment 1 and Embodiment 2, the microscope system according to this embodiment can be modified in various ways.

In the microscope system 100 according to Embodiment 1, an optimum value for each relative position is automatically determined, whereas, in the microscope system according to this embodiment, after three-dimensional information indicating the relationship between a relative position, a rotation angle, and an evaluation value is displayed on the monitor 30, the observer determines a combination of an optimum value and a relative position which will satisfactorily correct spherical aberration while referring to the three-dimensional information. Therefore, in the microscope system according to this embodiment, similarly to the microscope system according to Embodiment 2, a combination of a relative position and an optimum value can be appropriately determined, even in a case in which a plurality of peaks of an evaluation value occur as illustrated in FIG. 9B, a case in which it is difficult to automatically specify a peak due to an influence of a noise, or other cases.

Generally, when the focal length of the objective 14 changes in accordance with the rotation angle of the correction collar 13, it cannot be judged whether the variation in evaluation value is caused by the correction of an aberration or the movement of a focal position. However, it can be at least considered that the aberration has been satisfactorily corrected in a combination of a relative position and a rotation angle with a largest evaluation value in the three-dimensional information described above, which is illustrated using contours, etc.

Accordingly, in the microscope system according to this embodiment, in which a function expressing the relationship between a relative position and an optimum value is calculated using the combination of the relative position and the rotation angle with a largest evaluation value in the three-dimensional information, a spherical aberration can be satisfactorily corrected even for the objective 14 in which a focal length slightly changes in accordance with the rotation angle of the correction collar 13.

Each of the embodiments described above is given as a concrete example in order to facilitate the understanding of the invention, and the present invention is not limited to these embodiments. The microscope system according to each of the embodiments should be modified and varied in various ways within the scope of the present invention specified in the claims.

What is claimed is:

1. A microscope system, comprising:
an objective;
a correction apparatus configured to correct a spherical aberration;
a controller configured to:
(i) before an observation of an observation-target sample is started and by using the observation-target sample, obtain a plurality of combinations of a relative position of the objective to the observation-target sample and an optimum value, wherein the optimum value is a set value of the correction apparatus in a state in which a spherical aberration caused in accordance with the relative position has been corrected,
(ii) before the observation of the observation-target sample is started and by using the observation-target sample, calculate a function expressing a relationship between the relative position and the optimum value based on the obtained plurality of combinations by interpolation, and
(iii) during the observation of the observation-target sample, calculate the optimum value according to an observation target surface of the sample, which is orthogonal to an optical axis of the objective, based on the function calculated by using the observation-target sample and the relative position which is determined from the observation target surface; and
a correction apparatus driving apparatus configured to, during the observation of the observation-target sample, drive the correction apparatus in accordance with the optimum value, which is calculated by the controller.

2. The microscope system according to claim 1, wherein the correction apparatus comprises a correction collar which moves a lens in the objective.

3. The microscope system according to claim 2, wherein the controller is further configured to:
receive a plurality of inputs by an observer, each of the plurality of inputs specifying the relative position,
determine the set value with a maximum evaluation value from among a plurality of evaluation values, each of the plurality of evaluation values being calculated by one of a contrast evaluation method and a brightness evaluation method from each of obtained plural pieces of image data of the sample, while changing the set value for each of the received relative positions, to be the optimum value, and
obtain the plurality of combinations of the relative position and the optimum value.

4. The microscope system according to claim 3, wherein the controller is further configured to receive an input by the observer which specifies a range to be evaluated in the sample, and to calculate the evaluation value in the received range.

5. The microscope system according to claim 2, wherein the controller is further configured to:
receive a plurality of inputs by an observer, each of the plurality of inputs specifying the relative position,
control a display apparatus to display a graph indicating a relationship between an evaluation value and the set value, the evaluation value being calculated by one of a contrast evaluation method and a brightness evaluation method from each of obtained plural pieces of image data of the sample, while changing the set value for each of the received relative positions,
receive an input by the observer which specifies the set value for each of the received relative positions,
determine the received set value to be the optimum value, and
obtain the plurality of combinations of the relative position and the optimum value.

6. The microscope system according to claim 5, wherein the controller detects a contact input performed on the display apparatus, which displays the graph, and determines the set value corresponding to a point on the graph which is located at a position at which the contact input is detected to be the optimum value.

7. The microscope system according to claim 2, wherein the controller is further configured to:
illustrate three-dimensional information indicating a relationship between an evaluation value, the relative position, and the set value, wherein the evaluation value is calculated by one of the contrast evaluation method and the brightness evaluation method from each of obtained plural pieces of image data of the sample, while changing the relative position and the set value of the correction apparatus,
control the display apparatus to display the three-dimensional information,
receive an input by the observer which specifies a plurality of points on the three-dimensional information, and
obtain a combination of the set value and the relative position which is indicated by each of the received plurality of points as each of the plurality of combinations.

8. The microscope system according to claim 1, wherein the controller is further configured to receive an input by an observer which specifies the observation target surface, and to calculate the optimum value according to the observation target surface based on the function and the relative position, which is determined from the received observation target surface.

9. A non-transitory storage medium which stores a program of a microscope system, the microscope system comprising an objective, a correction apparatus configured to correct a spherical aberration, and a correction apparatus driving apparatus configured to drive the correction apparatus, wherein the program causes a computer to execute functions comprising:
before an observation of an observation-target sample is started and by using the observation-target sample, obtaining a plurality of combinations of a relative position of the objective to the observation-target sample and an optimum value, wherein the optimum value is a set value of the correction apparatus in a state in which a spherical aberration caused in accordance with the relative position has been corrected;
before the observation of the observation-target sample is started and by using the observation-target sample, calculating a function which indicates a relationship between the relative position and the optimum value from the obtained plurality of combinations by interpolation;
during the observation of the observation-target sample, calculating the optimum value according to an observation target surface of the sample, which is orthogonal to an optical axis of the objective, based on the function calculated by using the observation-target sample and the relative position which is determined from the observation target surface; and during the observation of the observation-target sample, controlling the correction apparatus driving apparatus to drive the correction apparatus in accordance with the calculated optimum value.

10. A method for correcting a spherical aberration that depends on an observation target of a microscope system, the microscope system including an objective, a correction apparatus configured to correct a spherical aberration, and a correction apparatus driving apparatus configured to drive the correction apparatus, and the method comprising:

before an observation of an observation-target sample is started and by using the observation-target sample, obtaining a plurality of combinations of a relative position of the objective to the observation-target sample and an optimum value, wherein the optimum value is a set value of the correction apparatus in a state in which a spherical aberration caused in accordance with the relative position has been corrected;

before the observation of the observation-target sample is started and by using the observation-target sample, calculating a function which indicates a relationship between the relative position and the optimum value from the obtained plurality of combinations by interpolation;

during the observation of the observation-target sample, calculating the optimum value according to an observation target surface of the sample, which is orthogonal to an optical axis of the objective, based on the function calculated by using the observation-target sample and the relative position which is determined from the observation target surface; and during the observation of the observation-target sample, controlling the correction apparatus driving apparatus to drive the correction apparatus in accordance with the calculated optimum value.

* * * * *